US010778956B2

(12) United States Patent
Lee (10) Patent No.: US 10,778,956 B2
(45) Date of Patent: Sep. 15, 2020

(54) EXPERIENCE SHARING SYSTEM COMPRISING SMART GLASSES AND VIRTUAL REALITY OR SMARTPHONE DEVICE (71) Applicant: Janggeun Lee, Sokcho-si (KR)

(72) Inventor: Janggeun Lee, Sokcho-si (KR)

( * ) Notice: Subject to any disclaimer, the term of this patent is extended or adjusted under 35 U.S.C. 154(b) by 0 days.

(21) Appl. No.: 16/338,038

(22) PCT Filed: Nov. 28, 2016

(86) PCT No.: PCT/KR2016/013813
§ 371 (c)(1),
(2) Date: Mar. 29, 2019

(87) PCT Pub. No.: WO2018/084359
PCT Pub. Date: May 11, 2018

(65) Prior Publication Data
US 2019/0238821 A1 Aug. 1, 2019

(30) Foreign Application Priority Data
Nov. 4, 2016 (KR) .................. 10-2016-0147033

(51) Int. Cl.
*H04N 13/194* (2018.01)
*H04N 13/279* (2018.01)
(Continued)

(52) U.S. Cl.
CPC ......... *H04N 13/194* (2018.05); *G06T 19/006* (2013.01); *H04N 13/00* (2013.01);
(Continued)

(58) Field of Classification Search
CPC .... H04N 13/00; H04N 13/189; H04N 13/194; H04N 13/279; H04N 21/816;
(Continued)

(56) References Cited

U.S. PATENT DOCUMENTS 61,847,265 * 7/2013 Kepner .................. G06T 17/05
2011/0111775 A1* 5/2011 Kim ...................... H04L 51/066
455/466

(Continued)

FOREIGN PATENT DOCUMENTS

JP 2014-187559 A 10/2014
KR 10-2004-0007727 A 1/2004
(Continued)

*Primary Examiner* — Alexander Eisen
*Assistant Examiner* — Nathaniel P Brittingham
(74) *Attorney, Agent, or Firm* — KORUS Patent, LLC; Seong Il Jeong (57) ABSTRACT The present invention relates to an experience sharing system, and more specifically to an experience sharing system that enables various experiences to be shared between humans. According to an embodiment of the present invention, there is provided an experience sharing system, including: smart glasses which are provided with a camera and wirelessly transmit a camera image taken via the camera; and a VR device which receives the camera image from the smart glasses and outputs the camera image as a virtual reality image.

1 Claim, 5 Drawing Sheets (51) Int. Cl.
*H04N 21/81* (2011.01)
*H04N 13/189* (2018.01)
*G06T 19/00* (2011.01)
*H04N 21/2743* (2011.01)
*H04N 21/4223* (2011.01)
*H04N 13/00* (2018.01)
*H04W 4/00* (2018.01)
*H04N 21/2187* (2011.01)

(52) U.S. Cl.
CPC ......... *H04N 13/189* (2018.05); *H04N 13/279* (2018.05); *H04N 21/2187* (2013.01); *H04N 21/2743* (2013.01); *H04N 21/4223* (2013.01); *H04N 21/816* (2013.01); *H04W 4/00* (2013.01)

(58) Field of Classification Search
CPC ............ H04N 21/2187; H04N 21/2743; G06T 19/006; H04W 4/00
See application file for complete search history.

(56) References Cited

U.S. PATENT DOCUMENTS

| | | | |
|---|---|---|---|
| 2012/0249590 A1* | 10/2012 | Maciocci | G06T 19/006 345/633 |
| 2014/0280620 A1* | 9/2014 | Lee | H04L 51/10 709/206 |
| 2014/0320399 A1* | 10/2014 | Kim | G02B 27/017 345/156 |
| 2016/0350595 A1* | 12/2016 | Solomin | G06K 9/00671 |
| 2017/0337738 A1* | 11/2017 | Kepner | G06T 17/05 |
| 2018/0068489 A1* | 3/2018 | Kim | G06F 3/04817 |
| 2019/0238821 A1* | 8/2019 | Lee | H04N 21/2187 |

FOREIGN PATENT DOCUMENTS

| | | |
|---|---|---|
| KR | 10-2014-0130330 A | 11/2014 |
| KR | 10-2015-0008621 A | 1/2015 |
| KR | 10-2016-0082892 A | 7/2016 |
| KR | 10-2016-0124479 A | 10/2016 |

* cited by examiner

EXPERIENCE SHARING SYSTEM COMPRISING SMART GLASSES AND VIRTUAL REALITY OR SMARTPHONE DEVICE

TECHNICAL FIELD

The present invention relates to an experience sharing system, and more specifically to an experience sharing system that enables various experiences to be shared between humans.

BACKGROUND ART

In the pre-modern era, recreation culture was established using a method, in which humans socialize with each other, in order to enjoy recreation due to undeveloped scientific technology.

However, due to the rapid development of science and technology, recreation culture has become dependent on game devices to which science and technology have been applied, rather than interpersonal relationships. As a result, humans have become more isolated due to lack of human-human interaction.

Meanwhile, users can view broadcasts, such as sports broadcasts, by means of IPTV, the Internet, mobile technology, or the like regardless of time and location. However, conventional technology simply provides a broadcast by means of the Internet or IPTV so that a user can view the broadcast in a desired time span. Since the user views the broadcast in a limited place by means of only personal sensation and information, sensations, such as the sensation of presence and a joint viewing experience, must be limited.

Therefore, there is an urgent need for a means capable of sharing an experience between humans.

DISCLOSURE

Technical Problem

An object of the present invention is to provide an experience sharing means that enables various experiences to be shared between humans. Furthermore, an object of the present invention is to provide a means that enables an experience to be shared in accordance with a rating.

Technical Solution

According to an embodiment of the present invention, there is provided an experience sharing system, including: smart glasses which are provided with a camera and wirelessly transmit a camera image taken via the camera; and a VR device which receives the camera image from the smart glasses and outputs the camera image as a virtual reality image.

There is provided an experience sharing system, including: smart glasses which are provided with a camera and wirelessly transmit a camera image taken via the camera; and a smartphone which receives the camera image from the smart glasses and stores and outputs the camera image.

There is provided an experience sharing system, including: smart glasses which are provided with a camera and wirelessly transmit a camera image taken via the camera; a relay smartphone which transmits the camera image, received from the smart glasses, to a remote smartphone, which is a smartphone remote from the smart glasses, over a mobile communication network as a camera image message; and the remote smartphone which stores and outputs the camera image received from the relay smartphone.

The experience sharing system may further include a VR device which outputs the camera image as a virtual reality image; the remote smartphone may extract the camera image from the camera image message received from the relay smartphone and may transmit the camera image to the VR device; and the VR device may output the camera image, received from the relay smartphone, as the virtual reality image.

The camera image message may include a header field and a data field; the relay smartphone may receive the rating of the camera image, may store the rating in the header field, and may store the camera image, received from the smart glasses, in the data field; and the remote smartphone may extract the rating from the camera image message received from the relay smartphone, and, when the rating of the possessor of the remote smartphone does not correspond to the rating, may not transmit the camera image, extracted from the camera image message received from the relay smartphone, to the VR device that is connected to the relay smartphone through wireless communication.

Advantageous Effects

According to an embodiment of the present invention, an experience can be shared between humans by using smart glasses and a smartphone, thereby improving fellowship. Furthermore, according to an embodiment of the present invention, selective viewing in accordance with a rating can be performed, thereby enabling various businesses to be developed.

BEST MODE

The present invention is directed to the provision of an experience sharing system, including: smart glasses which are provided with a camera and wirelessly transmit a camera image taken via the camera; and a VR device which receives the camera image from the smart glasses and outputs the camera image as a virtual reality image.

MODE FOR INVENTION

The advantages and features of the present invention and methods for achieving the advantages and the features will be apparent from embodiments that will be described in detail below in conjunction with the accompanying drawings. However, the present invention is not limited to the embodiments disclosed below, but may be implemented in various different forms. The present embodiments are provided merely to fully convey the scope of the present invention to those having ordinary knowledge in the art to the present invention pertains. The present invention is defined only by the scope of the attached claims. Throughout the specification, the same reference symbols designate the same components. Furthermore, in the description of the present invention, when it is determined that a related well-known technology or the like may make the gist of the present invention obscure, a detailed description thereof will be omitted.

Figure 1:
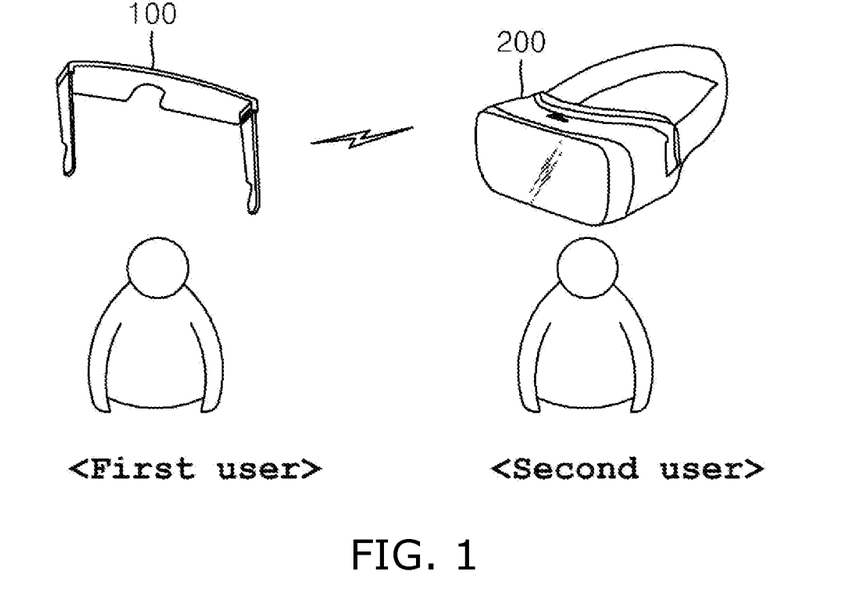
FIG. 1 is a view showing the configuration of an experience sharing system according to a first embodiment of the present invention.

FIG. 1 is a view showing the configuration of an experience sharing system according to a first embodiment of the present invention.

Based on the humanism that seeks to solve the loneliness of humans by means of a method of relying on science and technology, the present invention enables experiences to be shared between various parties, such as between humans, between loving persons, between a parent and a child, between a teacher and a student, between a technician and a learner, between a criminal and a victim, between an active person and a passive person, etc.

Persons will view the world with the eyes of counterparts, and will be in a corresponding place wherever they go to the place. Accordingly, longing for persons will be solved, and a user will accompany loved persons anytime and anywhere.

For this purpose, as shown in FIG. 1, the present invention includes smart glasses 100 and a VR device 200.

The smart glasses 100 are glasses in which glass lenses that are worn on eyes are equipped with a display, so that a user can use a required app. These smart glasses 100 include a short-distance wireless communication module. For the short-distance wireless communication module, a wireless communication method, such as Bluetooth, Home Radio Frequency (RF), or Wireless LAN, may be used.

The smart glasses 100 of the present invention include a camera module that is disposed on a glass frame. Preferably, the camera module may be provided on the front surface of the glass frame. A camera image may be generated according to the line of vision of a glass wearer. Accordingly, a camera image having a field of vision identical to that of the glass wearer may be generated.

For reference, the camera may include a lens assembly, a filter, an optic-to-electric conversion module, and an analog/digital conversion module. The lens assembly includes a zoom lens, a focus lens, and a compensation lens. The focal distances of the lenses may be varied under the control of a focus motor MF. The filter may include an optical low-pass filter and an infrared cut filter. The optical low-pass filter removes the optical noise of a high-frequency component, and the infrared cut filter blocks the infrared component of incident light. The optic-to-electric conversion module converts light, output from an optical system OPS, into an electrical analog signal. The analog/digital conversion module may remove high-frequency noise, adjust amplitude, and then convert the analog signal, output from the optic-to-electric conversion module OEC, into a digital signal by processing the analog signal output from the optic-to-electric conversion module OEC, thereby generating a camera image.

The smart glasses 100 transmit the camera image, taken by the camera, to the VR device 200 through short-distance wireless communication, such as Bluetooth communication.

The virtual reality (VR) device is a device that displays virtual reality images. A virtual reality image is an image that is obtained by displaying a 3D image, i.e., a virtual world expressed as if it were a reality, by means of a "visual illusion effect" enabling a viewer to have a three-dimensional sensation and a perspective sensation. A virtual reality image may be displayed via special glasses and the VR device 200. A virtual reality image is viewed via an image, taken by a 360-degree camera, by means of a worn headset, and is considerably more immersive than a 3D image.

Accordingly, the VR device 200 receives a camera image from the smart glasses 100, converts the camera image into a virtual reality image, and outputs the virtual reality image. The conversion into a virtual reality image refers to conversion into a three-dimensional image, and one of the well-known existing various image conversion algorithms of the VR device 200 may be used.

As a result, in the case where under a configuration, such as that shown in FIG. 1, it is assumed that a first user wears the smart glasses 100 and a second user wears the VR device 200, the second user wearing the VR device 200 may view a scene on the line of vision of the first user wearing the smart glasses 100 in the form of a virtual reality image.

Therefore, the second user may share an image identical to an image within the field of vision of the first user, thereby sharing the same experience.

Figure 2:
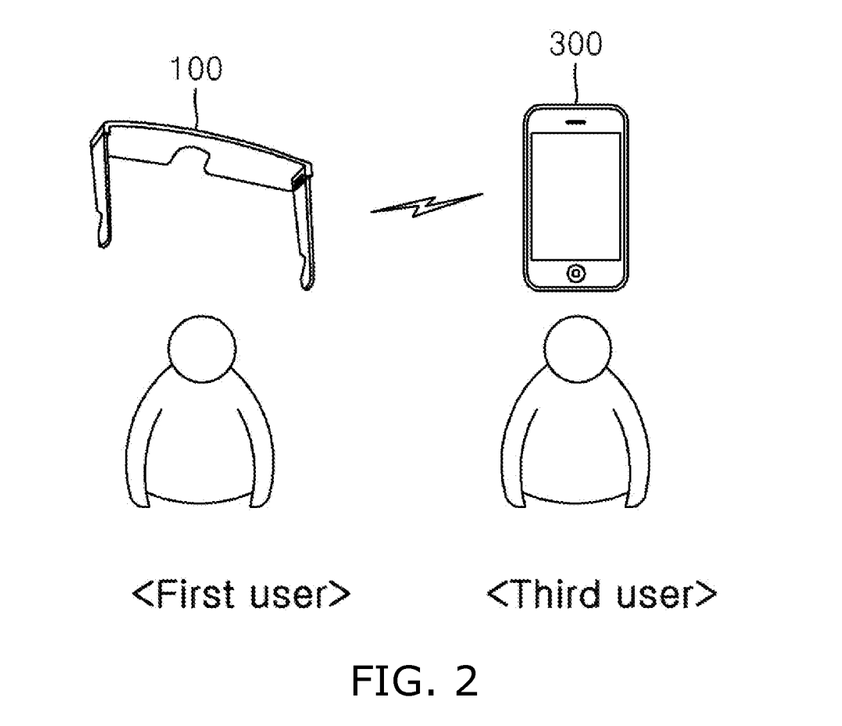
FIG. 2 is a view showing the configuration of an experience sharing system according to a second embodiment of the present invention.

FIG. 2 is a view showing the configuration of an experience sharing system according to a second embodiment of the present invention.

Smart glasses 100 include a camera module that is disposed on a glass frame. Preferably, the camera module may be provided on the front surface of the glass frame. The smart glasses 100 transmit a camera image, taken by the camera, to a VR device 200 through short-distance wireless communication, such as Bluetooth communication.

The smartphone 300 is a mobile communication module that receives a camera image from the smart glasses 100 through short-distance wireless communication (Bluetooth communication), stores the camera image in memory and outputs the camera image to a screen. For reference, in this case, the smartphone 300 refers to an intelligent terminal in which computer-assisted functions, such as Internet communication, information search, etc., have been added to a mobile phone. A user may install a desired application on the smartphone 300. The smartphone 300 may directly connect to the Internet by means of the wireless Internet, and may connect to the Internet by means of various methods using various browsing programs. Furthermore, the smartphone 300 allows hundreds of various applications (application programs) to be installed, added, or deleted as desired by the user, unlike existing mobile phones. Accordingly, the user may direct create a desired application, and may implement an interface suitable for him or her via various applications.

Furthermore, the memory in which a camera image is stored is a module that is capable of inputting and outputting information, such as a hard disk drive, a solid state drive (SSD), flash memory, a compact flash (CF) card, a secure digital (SD) card, a smart media (SM) card, a multimedia card (MMC), a memory stick, or the like. The memory may be provided inside the device, or may be provided inside a separate device. Accordingly, the camera image received from the smart glasses 100 may be stored in an internal memory drive, an external memory card, or the like.

Furthermore, the camera image is displayed on the screen of the smartphone 300, and thus users may share a field-of-vision image.

For example, in the case where under a configuration, such as that shown in FIG. 2, it is assumed that a first user wears the smart glasses 100 and a third user possesses the smartphone 300, a scene on the line of vision of the first user wearing the smart glasses 100 may be displayed on the screen of the smartphone 300 of the third user in the form of an image, and may be viewed. Accordingly, the third user may share an image identical to that within the field of vision of the first user, thereby sharing the same experience.

Figure 3:
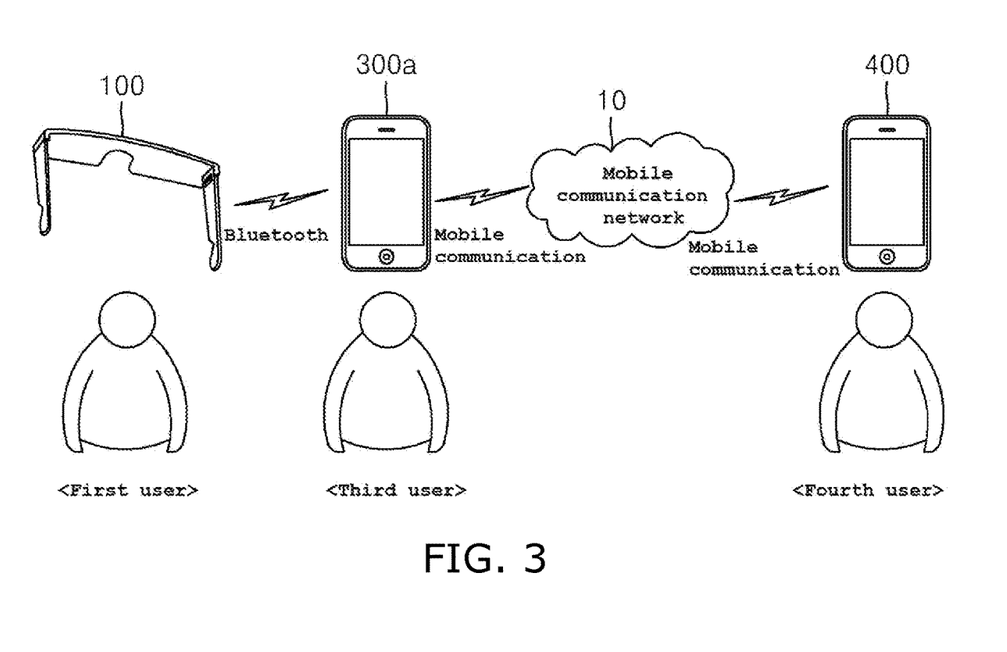
FIG. 3 is a view showing the configuration of an experience sharing system according to a third embodiment of the present invention.
Figures 4, 5:
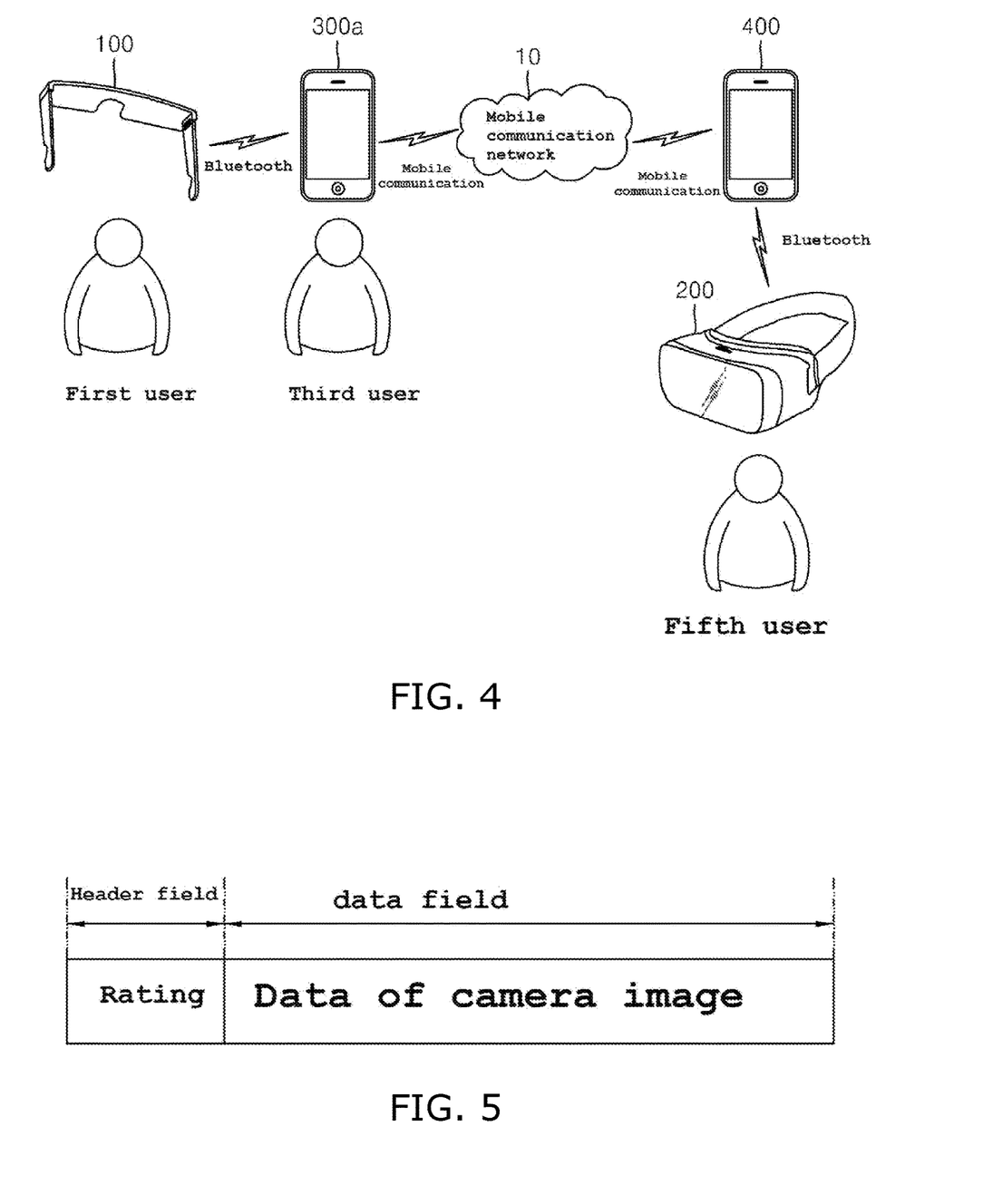
FIG. 4 is a view showing the configuration of the experience sharing system to which a VR device has been added according to the third embodiment of the present invention.
FIG. 5 is a view showing the frame structure of a camera image message according to an embodiment of the present invention.

FIG. 3 is a view showing the configuration of an experience sharing system according to a third embodiment of the present invention, and FIG. 4 is a view showing the configuration of the experience sharing system to which a VR device has been added according to the third embodiment of the present invention.

The above-described experience sharing systems shown in FIGS. 1 and 2 illustrate examples in which different users within a short-distance wireless communication range from the smart glasses 100 share an experience. The present invention is not limited to these examples, but an experience may be shared with a smartphone 300 or VR device within a long-distance range outside the short-distance wireless communication range.

For this purpose, a mobile communication network 10, smart glasses 100, a relay smartphone 300*a*, and a remote smartphone 400 are included.

The mobile communication network 10 is a communication network that provides 3G or 4G mobile communication service or the like between the relay smartphone 300*a* and the remote smartphone 400. Data communication may be performed using the wireless mobile communication network 10 including a base transceiver station (BTS), a mobile switching center (MSC), and a home location register (HLR).

The smart glasses 100 are a module that is provided with a camera and transmits a camera image, taken by a camera, through short-distance wireless communication.

The relay smartphone 300*a* is a smartphone 300 that is present within a short-distance wireless communication range from the smart glasses 100. For example, when the short-distance wireless communication range is a radius of 50 m, the relay smartphone 300*a* refers to a smartphone 300 within a radius of 50 m from the smart glasses 100. The relay smartphone 300*a* transmits a camera image, received from the smart glasses 100, to the remote smartphone 400, i.e., a smartphone 300 remote from the smart glasses 100, over the mobile communication network 10 in the form of a camera image message.

The remote smartphone 400 stores the camera image, received from the relay smartphone 300*a*, in memory, and outputs the camera image to a screen. Accordingly, the camera image stored in the remote smartphone 400 may function as an image in a black box.

As described above, an experience may be shared using the relay smartphone 300*a* and the remote smartphone 400. For example, when a fourth user wearing the smart glasses 100 is in Sokcho, he or she may transmit a camera image, taken via the smart glasses 100, to the remote smartphone 400 of the third user by means of his or her relay smartphone 300*a*. Accordingly, the fourth user and the first user may share the experience in real time via the same image.

Furthermore, the experience sharing system according to the third embodiment of the present invention may include a VR device 200 that outputs a virtual reality image, as shown in FIG. 4.

Accordingly, the remote smartphone 400 may extract the camera image from the camera image message received from the relay smartphone 300*a* and may transmit the camera image to the VR device 200, and the VR device 200 may output the camera image, received from the relay smartphone 300*a*, in the form of a virtual reality image.

For example, when the first user wearing the smart glasses 100 is in Sokcho, he or she may transmit a camera image, taken via the smart glasses 100, to the remote smartphone 400 of a fifth user in Seoul by means of his or her relay smartphone 300*a*, and the remote smartphone 400 may relay the camera image to the VR device 200, so that the fifth user and the first user may share an experience in real time via the same image.

As a result, such the sharing of an experience may be utilized in various fields, as described below:

1) The value of presence: A sense of presence is given to the value of presence that is decreasing gradually, and a sense of loneliness and a sense of isolation are solved.

2) Traveling together on a trip: The vision of a counterpart is projected and reflected onto a counterpart device as it is in domestic and overseas trips.

3) The prevention of crime: when returning home, a woman may return along with a guardian.

4) The effect of learning: An extra class may be given even in different spaces.

5) The observation of going to school: it may be possible to observe whether a child is appropriately going to school when going to school and to observe whether a safety problem has occurred, and appropriate guidance may be provided.

6) The effect of experiences: Experiences on fishing, mountain hiking, and hobby activities are shared.

7) The transfer of technology: A technician directly transfers technology to a learner between the technician and the learner by using the eyes of the technician.

8) The replacement of a black box: The present invention replaces a black box that is carried on a car.

9) Military training: it may be possible to give smooth and vivid training to soldiers in the military.

10) The recording of a video: a reality may be recorded, saved, and stored as it is thanks to a recording function.

11) The viewing of a movie: one person may go to a movie theater, and another person may view a movie at home.

12) The solving of a problem: a user may be instructed to solve a problem that is not solved.

13) The connection between humans: when a sharing function is activated, a user may connect with anyone, and may become the person.

Meanwhile, an implementation may be made such that a camera image taken by the smart glasses 100 can be transmitted to a plurality of remote smartphones 400 through the relay smartphone 300*a*. In this case, it is not preferable to imprudently transmit the camera image to all remote smartphones 400. For example, when the camera image taken by the smart glasses 100 is a camera image that can be viewed only by adults, it is necessary to prevent the camera image from being relayed to a VR device that is used by an adolescent. The following description will be given in detail with reference to FIGS. 5 to 7.

Figure 6:
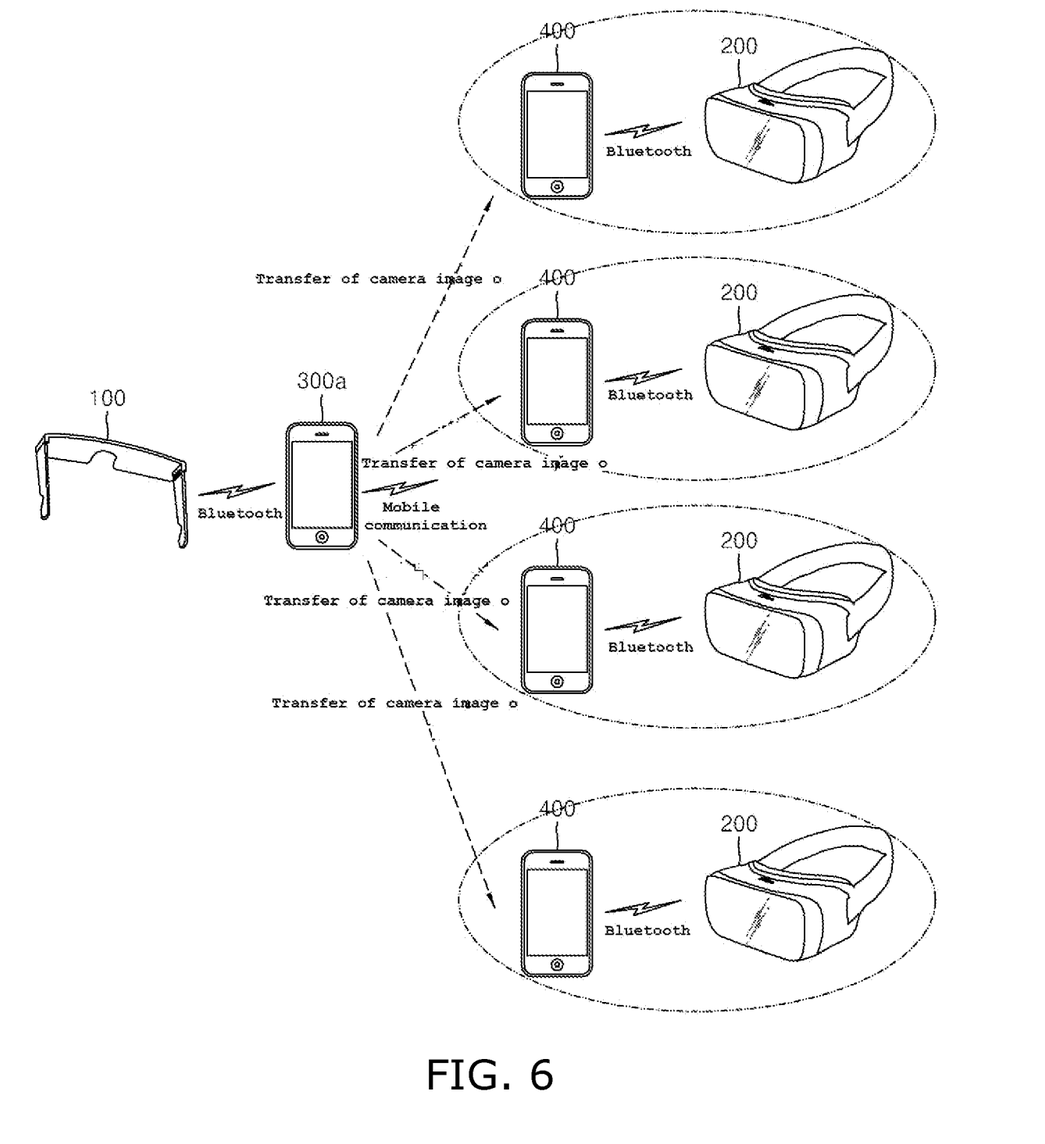
FIG. 6 is a view showing a situation in which a camera image is transmitted to all remote smartphones when a corresponding rating is G (suggested for general audiences) according to an embodiment of the present invention.
Figure 7:
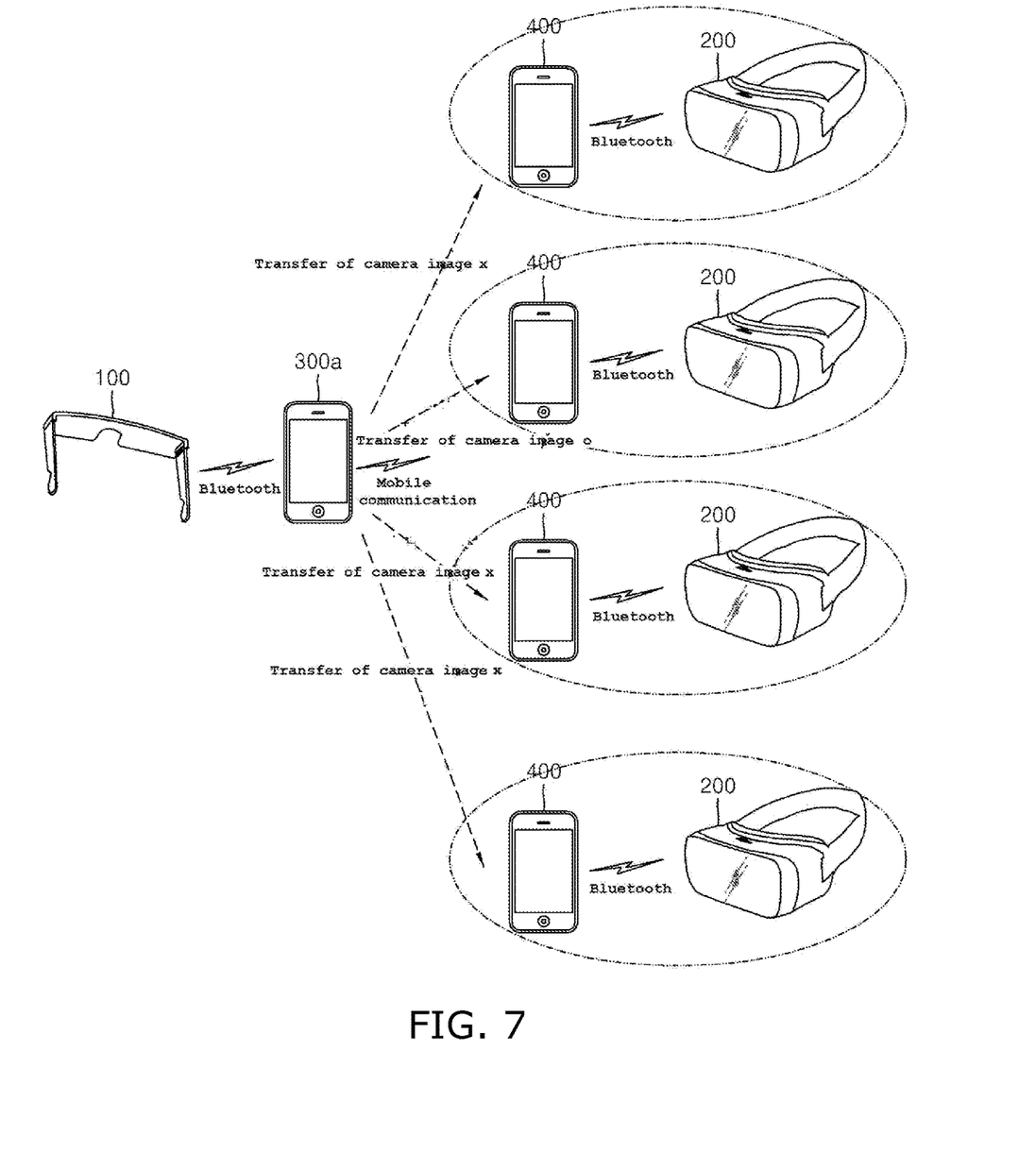
FIG. 7 is a view showing a situation in which a camera image is selectively transmitted to remote smartphones in accordance with a corresponding rating according to an embodiment of the present invention.

FIG. 5 is a view showing the frame structure of a camera image message according to an embodiment of the present invention, FIG. 6 is a view showing a situation in which a camera image is transmitted to all remote smartphones when a corresponding rating is an all-ages-admitted rating according to an embodiment of the present invention, and FIG. 7 is a view showing a situation in which a camera image is selectively transmitted to remote smartphones in accordance with a corresponding rating according to an embodiment of the present invention.

To allow a camera image to be selectively provided to remote smartphones 400, the frame of a camera image message includes a header field and a data field, as shown in FIG. 5.

A relay smartphone 300a receives the rating of the camera image, stores the rating in the header field, and stores the camera image, received from the smart device, in the data field. The rating may correspond to one of various ratings including a first rating, a second rating, a third rating, an all-ages-admitted rating, a persons-under-17-admitted rating, and a no-one-under-17-admitted rating.

The remote smartphone 400 extracts the rating from the camera image message received from the relay smartphone 300a. When the rating of the possessor of the remote smartphone 400 does not correspond to the rating, the camera image extracted from the camera image message received from the relay smartphone 300a is not transmitted to a VR device 200 that is connected to the relay smartphone 300a through short-distance wireless communication.

For example, when the rating is an "all-ages-admitted rating," the camera image is transmitted to all VR devices 200 linked to the remote smartphone 400 through short-distance wireless communication, as shown in FIG. 6.

In contrast, when the rating is a "no-one-under-17-admitted rating," the camera image is not transmitted to a VR device 200 in the case of the remote smartphone 400 that is used by an adolescent, as shown in FIG. 7. For reference, the rating of the possessor of the remote smartphone 400 may be stored inside the smartphone 300 in advance, or may be determined using the user information of the remote smartphone 400.

In the above description of the present invention, the embodiments are selected from among various practicable examples as the most preferred examples and then presented in order to help the understanding of those skilled in the art, and the technical spirit of the present invention is not restricted or limited by these embodiments. Various changes, various variations, and other equivalent embodiments may be made without departing from the technical spirit of the present invention.

INDUSTRIAL APPLICABILITY

The present invention is applicable to the field of an experience sharing system that enables various experiences to be shared between humans and also enables an experience to be selectively shared in accordance with a rating.

The invention claimed is:

1. An experience sharing system, comprising:
smart glasses which are provided with a camera and wirelessly transmit a camera image taken via the camera, the camera comprising a lens assembly, a filter which removes optical noise and infrared component of incident light, an optic-to-electric conversion module which converts light into an electrical analog signal and an analog-digital conversion module which removes high-frequency noise, adjusts amplitude, and then converts the analog signal into a digital signal by processing the analog signal thereby generating the camera image;
a relay smartphone which transmits the camera image received from the smart glasses, to a remote smartphone, which is a smartphone remote from the smart glasses, over a mobile communication network as a camera image message;
the remote smartphone which stores and outputs the camera image received from the relay smartphone and extracts the camera image from the camera image message received from the relay smartphone; and
a virtual reality (VR) device which receives the camera image from the remote smartphone, outputs the camera image as a virtual reality image and shares experience regarding at least one field of value of presence, travel, prevention of crime, effect of learning, observation of going to school, transfer of technology, replacement of a black box, military training, recording of a video, viewing of a movie and solving of a problem;
wherein the camera image message comprises a header field and a data field;
the relay smartphone receives a rating of the camera image, stores the rating in the header field, and stores the camera image, received from the smart glasses, in the data field and classifies the rating as one of a first rating, a second rating, a third rating, an all-ages-admitted rating, a persons-under-17-admitted rating, and a no-one-under-17-admitted rating; and
the remote smartphone extracts the rating from the camera image message received from the relay smartphone, and, when a rating of a possessor of the remote smartphone does not correspond to the rating, does not transmit the camera image, extracted from the camera image message received from the relay smartphone, to the VR device that is connected to the relay smartphone through wireless communication.

* * * * *